United States Patent
Gullick et al.

(10) Patent No.: US 9,250,374 B2
(45) Date of Patent: Feb. 2, 2016

(54) STRIP LIGHTING DEVICE

(71) Applicants: Daniel Gullick, Chelmsford (GB);
Pawel Murzyn, Chelmsford (GB)

(72) Inventors: Daniel Gullick, Chelmsford (GB);
Pawel Murzyn, Chelmsford (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 85 days.

(21) Appl. No.: 14/184,326

(22) Filed: Feb. 19, 2014

(65) Prior Publication Data
US 2014/0240954 A1 Aug. 28, 2014

(30) Foreign Application Priority Data

Feb. 26, 2013 (GB) .................................. 1303410.3

(51) Int. Cl.
*G01D 11/28* (2006.01)
*F21V 8/00* (2006.01)
*G01D 13/26* (2006.01)

(52) U.S. Cl.
CPC ............ *G02B 6/0005* (2013.01); *G01D 13/265* (2013.01); *G02B 6/001* (2013.01); *G01D 11/28* (2013.01); *G02B 6/0018* (2013.01)

(58) Field of Classification Search
CPC .......... G02F 1/133615; F21V 2200/00; F21V 2200/15; F21V 2200/20; G01D 11/28; G01D 13/20; G01D 13/265; G02B 1/046; G02B 1/048; G02B 6/001; G02B 6/0005; G02B 6/0018; G02B 6/02; G02B 6/0001; G02B 6/0011; G02B 6/0016; G02B 6/0015
See application file for complete search history.

(56) References Cited

U.S. PATENT DOCUMENTS

| 5,142,453 A * | 8/1992 | Ohta ...................... G01D 11/28 116/288 |
| 5,678,913 A * | 10/1997 | Ishimaru ................ B60K 35/00 362/23.07 |
| 6,549,714 B1 * | 4/2003 | Kim ....................... C08G 73/10 385/143 |
| 6,820,990 B2 * | 11/2004 | Ewers .................... B60Q 3/004 362/23.08 |
| 2015/0168644 A1 * | 6/2015 | Meyers .................. G01D 11/28 362/511 |

FOREIGN PATENT DOCUMENTS

| CN | 202182417 U | 4/2012 |
| EP | 0 874 191 A2 | 10/1998 |
| EP | 0 899 503 A1 | 3/1999 |

* cited by examiner

*Primary Examiner* — Bao Q Truong
(74) *Attorney, Agent, or Firm* — Dickinson Wright PLLC

(57) ABSTRACT

A strip lighting device includes a main body having front and rear sides extending along a length of the main body. The front side is disposed towards a viewer of the device and the rear side includes a light scattering layer for scattering light from a source of illumination towards the viewer when the device is illuminated. The main body has a front and rear cladding layer each of which is made of a first light transmissive material. The strip lighting device includes a light pipe made of a second light transmissive material sandwiched between the front and rear cladding layers at interfaces extending along the length of the main body. A rear interface of the light pipe has a plurality of angled portions which allow some light to escape into the rear cladding layer to impinge on the light scattering layer and scatter light towards the viewer.

11 Claims, 2 Drawing Sheets

STRIP LIGHTING DEVICE

CROSS REFERENCE TO RELATED APPLICATION

This U.S. Patent Application claims the benefit of United Kingdom Patent Application No. 1303410.3 filed Feb. 26, 2013, entitled "Strip Lighting Device," the entire disclosure of the application being considered part of the disclosure of this application and hereby incorporated by reference.

BACKGROUND a. Field of the Invention

This invention relates to a strip lighting device and to a pointer for a display including such a strip lighting device. More particularly this invention relates to a strip lighting device for use in a pointer of a motor vehicle display.

b. Related Art

Light pipes or light guides are known for use in the illumination of moving pointers in displays and also for the static illumination of display surfaces or other features. These light pipes find particular use in motor vehicle dashboard displays. All such elongate or slender illuminated devices are referred to herein as strip lighting devices.

The light pipes are typically made of a transparent or translucent plastics material, and utilize the principle of total internal reflection occurring at the material/air interface to obtain transmission of light along the light pipe.

In many applications it is desirable to extract light along the length of the light pipe, either in discrete regions or continuously along its length. Various extracting features are known in the art, for example a rough surface finish or notches formed in the surface of the light pipe, which are used to introduce losses in that region of the light pipe.

While the use of these known extracting features can be an effective and simple mechanism for creating the desired illumination in some circumstances, there are situations in which it is not possible or desirable to include the extraction features, thereby limiting the control of light output along the length of the light pipe. In motor vehicles, the light pipes used as halo rings around the headlights and the light pipes used in the dashboard display, for example in a pointer, are visible and the appearance and shape of the light pipe is entirely defined by styling of that vehicle. As such, it is not possible to modify the appearance of the light pipe through the introduction of extracting features, for example surface texturing, to enable the amount of light extracted from the light pipe to be controlled. In these situations, therefore, illumination intensity along and around the light pipe depends largely on the styling imposed by the car manufacturer and the end customer.

One particular example is a light pipe used within the arm of a moving pointer in a dashboard display (e.g. speedometer). It can be difficult to achieve an even intensity of illumination along the pointer and, typically, the illumination varies significantly between the root and the tip of the pointer arm. Furthermore, customer feedback is creating increased demands on the required uniformity of the illumination of the pointers, to improve the ease with which the displays are read and to improve the overall appearance of the display. The use of current methods and extraction features, however, typically cannot achieve an illumination intensity variation along a pointer arm of less than 10%, without noticeably affecting the appearance of the pointer arm.

It is, therefore, an object of the present invention to provide an improved strip lighting device incorporating a light guide, including means for controlling the amount of light extracted from the light guide that overcomes some of the drawbacks described above.

SUMMARY OF THE INVENTION

According to a first aspect of the invention there is provided a strip lighting device for receiving visible light from a source of illumination to illuminate the device with visible light. The strip lighting device includes a main body having opposite front and rear sides extending along the length of the main body, the front side, in use, being disposed towards a viewer of the device, and the rear side including a light scattering layer for scattering light from said source of illumination towards the viewer when the device is illuminated. The main body includes a front cladding layer and a rear cladding layer extending along the length of the main body. The front cladding layer is relatively forward of the rear cladding layer relative to the viewer and the layers are each made of a first light transmissive material for conveying the light.

A light pipe is arranged to receive light from the source of illumination and is made of a second light transmissive material for conveying the visible light. The light pipe is sandwiched between and in contact with the front and rear cladding layers at, respectively, a front interface and a rear interface, with the interfaces extending along the length of the main body. The front interface is smooth to facilitate total internal reflection as light is conveyed along the light pipe and the rear interface includes a plurality of angled portions spaced along the length of the light pipe to allow some of the conveyed light to escape from the light pipe into the rear cladding layer to impinge on the light scattering layer whereby the light scattering layer scatters the light though the light transmissive layers of the rear cladding layer, the light pipe and the front cladding layer towards the viewer of the device.

In the first aspect of the invention, the interfaces preferably extend along substantially the full length of the main body, so that the interfaces are continuous.

The first light transmissive material may be polymethyl methacrylate and the second light transmissive material may be polycarbonate.

The angled portions preferably comprise triangular notches.

In order to control the amount of light or evenness of the light that exits along the length of the device, the depth of the angled portions may increase from a first end of the light pipe to a second end of the light pipe, the first end being optically closest to the source of illumination.

For the same reason, the spacing between neighboring angled portions may decrease from a first end of the light pipe to a second end of the light pipe, the first end of the pipe being optically closest to the source of illumination.

According to a second aspect of the invention, there is provided a strip lighting device comprising a slender main body and a source of illumination for illuminating the main body with visible light. The main body has opposite front and rear sides extending along the length of the main body. The front side, in use, is disposed towards a viewer of the device, and the rear side includes a light scattering layer for scattering light from the source of illumination towards the viewer when the main body is illuminated.

The main body includes a front cladding portion and a rear cladding portion with the front and rear cladding portions each extending along the length of the main body and being made of a first light transmissive material for conveying the light. The front cladding portion is relatively forwards of the rear cladding portion relative to the viewer and is arranged to receive light from the source of illumination. A discontinuous layer extends along the length of the main body and includes a plurality of discrete regions of a second light transmissive material having a lower refractive index than the first light transmissive material. Each of the discrete regions are sandwiched between and in contact with the front and rear cladding portions at, respectively, a front interface and a rear interface. The discrete regions have gaps between them such that the first light transmissive material extends through the gaps to connect the front and rear cladding portions. The front interface of each of the discrete regions is smooth to facilitate total internal reflection as light is conveyed along the length of the front cladding portion and the gaps allow some of the conveyed light to impinge on the light scattering layer whereby the light scattering layer scatters the light through the rear cladding portion and the front cladding portion towards the viewer of the device.

In the second aspect of the invention, the first light transmissive material is polycarbonate and the second light transmissive material is polymethyl methacrylate.

In order to control the amount of light or evenness of the light that exits along the length of the device, the length of each of the discrete regions may decrease from a first end of the main body to a second end of the main body, the first end being optically closest to the source of illumination.

For the same reason, the length of each of the gaps may increase from a first end of the main body to a second end of the main body, the first end being optically closest to the source of illumination.

The discontinuous layer may be closer to the rear side of the main body than the front side of the main body such that that front cladding portion has a greater thickness than the rear cladding portion.

The following general description relates to either aspect of the invention.

The main body is slender in the sense that it is elongate or has more length than width, although not necessarily being straight. In some embodiments, the main body may be straight, for example when used as the indicating arm of a pointer display or a dial display. In other embodiments, the main body may be curved, for example in the shape of an arc or a loop, having along the length of the main body either a constant or a variable bend radius, as long as the bend radius of the main body is sufficiently gentle such that at least some of the light from the source of illumination is able to be transmitted along the length of the main body by total internal reflection. Therefore, the slender main body main may be either straight and elongate or curved and elongate. If the main body is straight, then the front interface is preferably flat, i.e. lying in a plane.

The difference in the refractive indices of the first light transmissive material and the second light transmissive material is such that the critical angle of incidence for total internal reflection at the front interface is greater than or equal to 70°, i.e. when measured from a normal to the line or plane of the interface at the point of incidence.

The light pipe may extend across a full width of the main body. The main body may have smooth sides extending between the front and rear surfaces of the main body, and also serving by means of total internal reflection to guide at least some of the light along the length of the main body. The front and rear sides may have a square profile in cross-section or may be rectangular in cross-section.

The front cladding layer may have a greater thickness than the rear cladding layer such that the light pipe is located closer to the rear side of the main body than to the front side of the main body.

As an example of the possible uses which may be made of the strip lighting device, a pointer display comprising a display area, and a pointer including an illuminated pointer arm, can incorporate in the pointer arm a strip lighting device according to either the first or the second aspect of the invention. The main body of the strip lighting device then extends along the pointer arm such that, when the strip lighting device is illuminated, the pointer arm appears illuminated to a viewer of the display.

BRIEF DESCRIPTION OF THE DRAWINGS

The invention will now be further described by way of example only and with reference to the accompanying drawings, in which.

DETAILED DESCRIPTION

Figure 1:
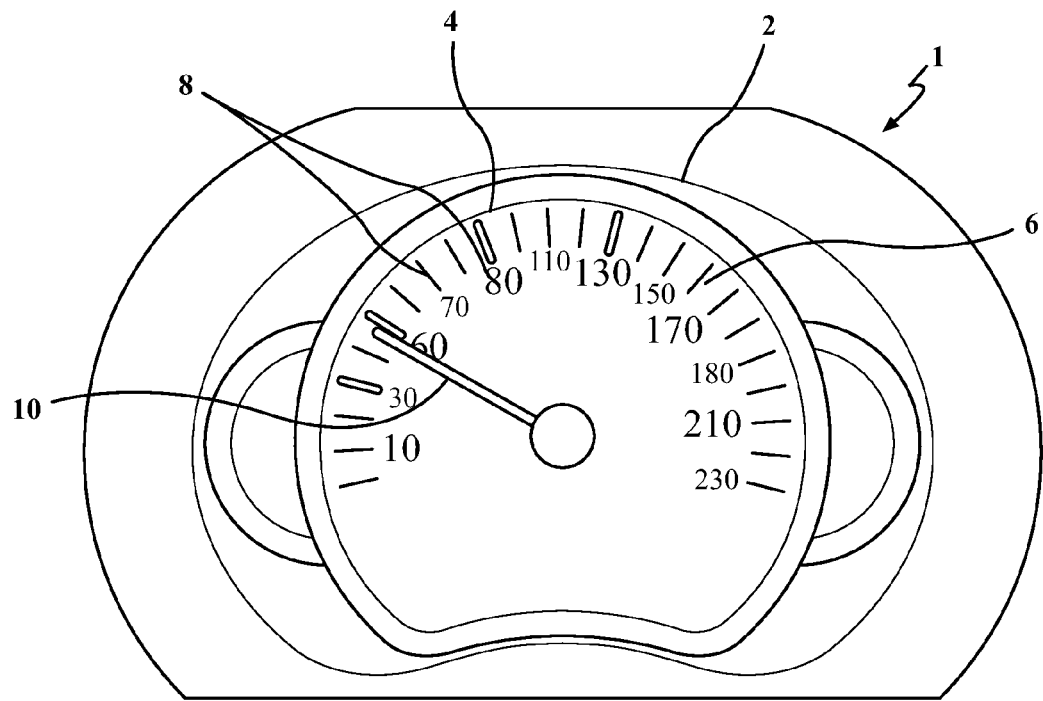
FIG. 1 is a plan view of a motor vehicle display unit including a dial display.

FIG. 1 shows a display unit 1 having a dial display 2 for use in a motor vehicle dashboard. The dial display 2 includes a dial 4 having a main display area 6 on which are a plurality of display indicia 8. In this example, the display indicia 8 comprise a series of scale marks and numbers indicating the speed of the vehicle.

Figure 2:
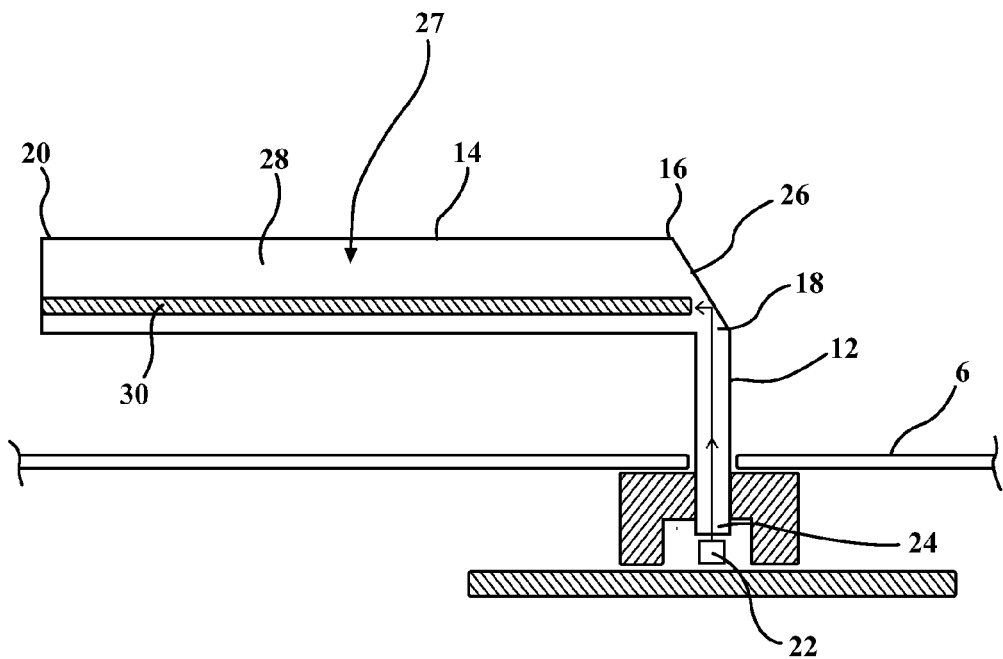
FIG. 2 is a cross-sectional view of an embodiment of a pointer in accordance with the present invention.

A rotatable pointer 10 is provided in the center of the dial 4. The rotatable pointer 10 comprises a shaft 12 and a pointer arm 14 that is rigidly connected at its first end 16 to an upper portion 18 of the shaft 12, as shown in FIG. 2. The pointer arm 14 extends outwards from the shaft 12 and the length of the pointer arm 14 is such that its second end 20 overlies at least a part of the display indicia 8 to enable a value to be read from the dial 4. In this example, the pointer arm 14 is integrally formed with the shaft 12.

The pointer shaft 12 and pointer arm 14 are both formed from light transmissive materials. A light source 22, in this example a light emitting diode (LED), is located adjacent a first or lower end 24 of the pointer shaft 12, and is arranged to project light into the first end 24 of the shaft 12. The shaft 12 acts as a light pipe and conveys the light from the first end 24 to the upper portion 18 of the shaft 12. A sloped surface 26 in the upper portion 18 of the shaft 12, in the region of intersection of the shaft 12 and pointer arm 14, causes the light transmitted along the shaft 12 to be deflected along the pointer arm 14.

The pointer arm 14 of the present invention comprises two light transmissive materials forming a light guide 27 along the length of the pointer arm 14. A main body 28 of the light guide 27 is made of a first light transmissive material and one or more regions 30, made of a second light transmissive material, are embedded within the body 28. Importantly, the first and second light transmissive materials have different refractive indices. It is advantageous, however, if the difference in the refractive indices is minimized so that the embedded regions 30 of the second material are not clearly distinguishable by a viewer of the pointer 10. The difference in the refractive indices is preferably such that the critical angle for reflection at an interface between the two materials is greater than or equal to 70°.

The light guide 27 is arranged within the pointer arm 14 such that light is introduced into the light guide 27 at a first end 32 and is emitted from a front face 34 of the light guide 27 that is disposed towards a viewer of the display. As such, the light guide 27 and light source 22 together from a strip lighting device for illuminating the pointer arm 14. Preferably, the light guide 27 extends along the full length of the pointer arm 14, so that the pointer arm 14 appears fully illuminated to a viewer of the dial display 2.

A light scattering portion 36 is provided by or applied to a rear face 38 of the light guide 27. The light scattering portion 36 may comprise a light reflective and light scattering coating or layer, or may comprise a textured surface. The light scattering portion 36 reflects and scatters all of the light incident on the rear face 38 back towards the front face 34 of the light guide 27.

Figure 3:
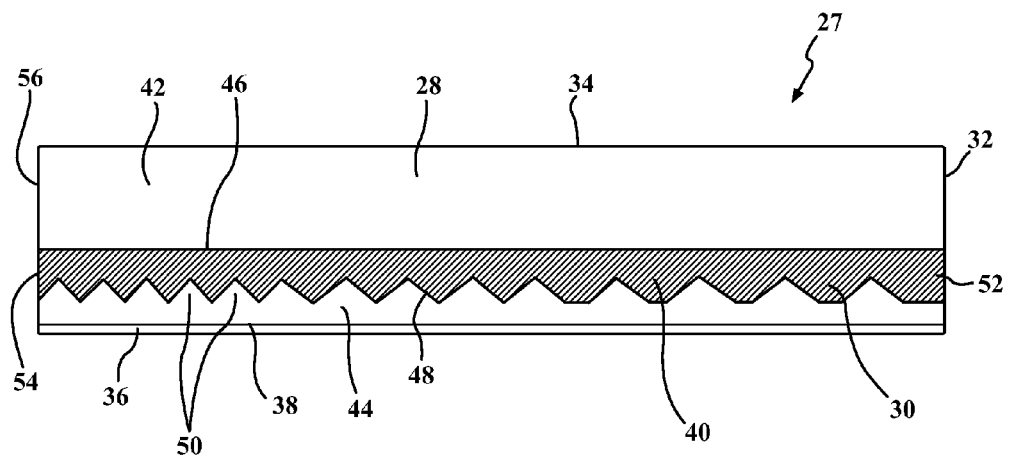
FIG. 3 is a cross-sectional view of a strip lighting device according to a first embodiment of the present invention.

A first embodiment of a dual material light guide 27 for use in a pointer arm 14 is shown in FIG. 3. For simplicity, the light guide 27 has a substantially rectangular cross-sectional shape such that the front face 34 of the light guide 27 is parallel to the rear face 38 of the light guide 27. The rear face 38 of the light guide 27 is covered by a layer of scattering foil 36, which forms a light scattering coating 36 as is known in the art, that acts to scatter light incident on the rear face 38, as described further below.

The body 28 of the light guide 27 is made of a first light transmissive material which has a lower refractive index than a second light transmissive material that forms a central layer or core 40 of the light guide 27. In this example, the first light transmissive material is polymethyl methacrylate (PMMA) having a refractive index of about 1.49, and the second light transmissive material is polycarbonate (PC) having a refractive index of about 1.58.

In this example, the core 40 extends for the full width of the light guide and continuously along the length of the light guide 27, with a first portion 42 of the body 28, in the form of a front cladding layer 42, located on a first, upper side of the core 40 and a second portion 44 of the body 28, in the form of a rear cladding layer 44, located on a second, lower side of the core 40. As such, a first interface 46 is formed between the core 40 and the first portion 42 of the body 28 and a second interface 48 is formed between the core 40 and the second portion 44 of the body 28. The core 40, therefore, forms an embedded region 30 of the second light transmissive material. In this example, the first interface 46 is parallel to the front face 34 of the light guide 27.

The depth of the first portion 42 of the body 28 is greater than the depth of the second portion 44 of the body 28, so that a distance between the first interface 46 and the front or upper face 34 of the light guide 27 is greater than a distance between the second interface 48 and the rear or lower face 38 of the light guide 27. In this way, the core 40 is located closer to the rear face 38 of the light guide 27 than to the front face 34.

The second interface 48 is serrated and comprises a plurality of angled surfaces forming a series of triangular notches 50 along the length of the core 40. The notches 50 form light extraction features 50 that allow light to escape from the core 40 into the body 28 of the light guide 27, as described below. The spacing and depth of the notches 50 may be varied along the length of the light guide 27 to control the amount of light that is extracted from the core 40 as a function of distance from a first end 52 of the core 40.

In use, light enters the first end 32 of the light guide 27, for example after being deflected by the sloped surface 26 of the pointer 10, and the light is coupled to the core 40 so that substantially all of the light enters the first end 52 of the core 40. Because the material of the core 40 has a higher refractive index than the material of the body 28, light impinging either the first or second interface 46, 48 at an angle greater than the critical angle is totally internally reflected, remains within the core 40 and is transmitted along the length of the light guide 27. The core 40, therefore, acts as an internal light pipe 40 within the body 28 of the light guide 27.

When light impinges on the second interface 48 at an angle less than the critical angle, the light is refracted and passes through the interface 48 into the second portion 44 of the body 28. The plurality of light extraction features 50 formed at the second interface 48 are arranged to control the amount of light that exits the core 40 at different distances along the length of the light guide 27. The refracted light within the second portion 44 that is incident on the rear face 38 of the light guide 27 is then scattered by the foil 36.

The scattered light passes through the core 40 and into the first portion 42 of the body 28 of the light guide 27. The scattered light can pass through the core 40 in this way because the light generally strikes the first and second interfaces 46, 48 at an angle less than the critical angle. Furthermore, the minimal difference in refractive indices of the core 40 and the body 28 means that minimal refraction of the light occurs as it passes through the core 40 and into the first portion 42 of the body 28. The scattered light within the first portion 42 of the body 28 then exits the light guide 27 through the front face 34.

If the core 40 did not include any extraction features 50, for example notches 50, the light that was initially coupled with the core 40 would remain within the core 40, due to the difference in refractive index of the two materials of the core 40 and the body 28 of the light guide 27. This light would be transmitted along the core 40 from the first end 52 to a second end 54 of the core 40 by total internal reflection.

If the core 40 included a uniform distribution of extraction features 50 along the length of the core 40, then the amount of light emitted from the front face 34 would decrease as a function of distance from the first end 32. This is because the amount of light transmitted within the core 40 decreases as a function of distance from the first end 32, and if a fixed proportion of that light is emitted along the length of the core 40, due to the uniformity of the core 40, then the overall intensity of the light emitted from the light guide 27 will also decrease as a function of distance from the first end 32.

The light that escapes from the core 40 and is subsequently emitted from the light guide 27 along its length can, therefore, be controlled by controlling the location and size of the light extraction features 50, namely the notches 50 in the second interface 48. In particular, the amount of light that is extracted from the core 40 in a defined region can be altered by varying the spacing and depth of the notches 50 in that region.

In the present example, illustrated in FIG. 3, the serrated interface 48 is designed so that light is emitted uniformly along the length of the front face 34 of the light guide 27 when light enters the light guide 27 only at the first end 32. To achieve this, the spacing of the notches 50 decreases from the first end 52 of the core 40 to a second end 54 and the depth of the notches 50 increases from the first end 52 to the second end 54. Increasing the number of notches 50 and increasing the depth of the notches 50 increases the amount of light that is extracted from the core 40.

This arrangement of light extraction features 50 means that proportionally less light is extracted in regions of the core 40 closest to the first end 52 resulting in a greater proportion of the light being transmitted along the core 40, and proportionally more light is extracted from the core 40 at greater distances from the first end 52. This results in more uniform light emission along the length of the core 40 and subsequently from the light guide 27.

In this embodiment of the light guide 27, therefore, the shape of the inner light pipe 40 is modified to provide a plurality of light extraction features 50 and the distribution and size of the light extraction features 50 is tailored to provide the required light extraction along the length of the light pipe 40 and the required illumination along the length of the light guide 27. The advantage of this configuration is that the modification is made to an internal interface 48 within the light guide 27 rather than an external surface of the light guide 27, and furthermore, because the two materials are preferably selected such that there is minimal difference in the refractive indices, the internal interface 48 is not readily visible to a viewer of the light guide 27. Providing and tailoring the light extraction features 50 to provide, for example, more uniform intensity light emission along the length of the light guide 27 can, therefore, be accomplished without changing the visible, external appearance of the light guide 27.

Accordingly, when the light guide 27 is used in a pointer arm 14 the distribution of emitted light along the length of the pointer arm 14 can be varied without affecting the external styling of the pointer arm 14.

Although in the above embodiment the light extraction features 50 were in the form of triangular notches, it will be appreciated that the light extraction features may be of any suitable shape. The light extraction features may, for example, be notches having a semi-circular cross-sectional shape. Furthermore, the distribution of the light extraction features along the length of the light pipe may be designed to provide a non-uniform illumination of the light guide, for example to create bands or a repeating pattern of higher and lower intensity light.

In some embodiments the light pipe may not extend across the full width of the light guide and/or may not extend along the full length of the light guide. In these embodiments, therefore, regions of the first light transmissive material will extend around the sides and/or the ends of the light pipe.

Figure 4:
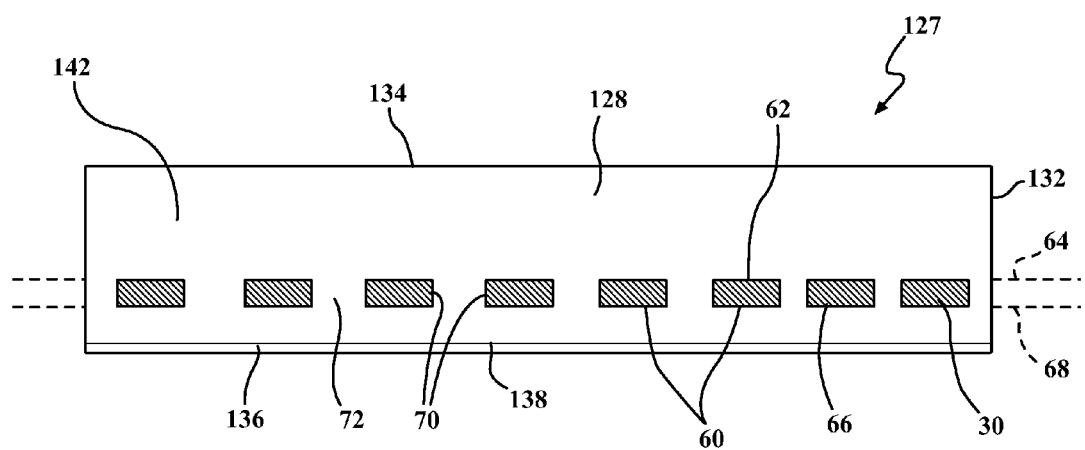
FIG. 4 is a cross-sectional view of a strip lighting device according to a second embodiment of the present invention.

A second embodiment of a dual material light guide 127 for use in a pointer arm 14 is shown in FIG. 4. Many of the features of this light guide 127 are the same as features of the previous embodiment and like features have been indicated by reference numerals incremented by 100.

As before, the light guide 127 has a substantially rectangular cross-sectional shape such that a front face 134 of the light guide 127 is parallel to a rear face 138 of the light guide 127. The rear face 138 of the light guide 127 is textured and metalized, as is known in the art, to provide a light scattering portion 136 to reflect and scatter light that is incident on the rear face 138.

The body 128 of the light guide 127 is made of a first light transmissive material having a higher refractive index than a second light transmissive material which forms discrete regions or islands 60 within the body 128 of the light guide 127. In this example, the first light transmissive material is polycarbonate (PC) having a refractive index of about 1.58, and the second light transmissive material is polymethyl methacrylate (PMMA) having a refractive index of about 1.49.

The discrete regions 60 are arranged in a single discontinuous layer along the length of the light guide 127 and, in this example, are substantially cuboidal and have a rectangular cross-sectional shape. The discrete regions 60 are of uniform thickness so that a first, upper surface 62 of each region 60 lies in a first plane 64 and a second, lower surface 66 of each region 60 lies in a second plane 68, parallel to and offset from the first plane 64. The regions 60 are located closer to the rear face 138 of the light guide 127 than the front face 134 so that the distance between the first plane 64 and the front face 134 is greater than the distance between the second plane 68 and the rear face 138.

The discrete regions 60 are spaced apart along the length of the light guide 127 having gaps 72 between them so that the first light transmissive material extends through the gaps 72 between opposing end faces 70 of neighboring regions 60. The length of the regions 60 and the spacing between the regions 60 can be varied to affect the amount of light that is transmitted along the light guide 127 by total internal reflection and the amount of light that is scattered by scattering portion 136 at the rear face 138 and emitted from the front face 134 of the light guide 127. As such, the arrangement of the discrete regions 60 can be tailored to create a desired emitted light intensity distribution along the length of the light guide 127.

In use, light enters the first end 132 of the light guide 127, for example after being deflected by the sloped surface 26 of the pointer 10, such that the light is coupled into the body 128 of the light guide 127. Preferably, the majority of the light is coupled into a first portion 142 of the body 128 between the first plane 64 and the front face 134 of the light guide 127. The light is generally transmitted along the length of the light guide 127 by total internal reflection, and a proportion of the light is reflected and scattered by the light scattering portion 136 at the rear face 138 and emitted through the front face 134 of the light guide 127.

Because the material of the body 128 has a higher refractive index than the material of the regions 60, any light that is incident on the first surface 62 of any of the discrete regions 60 at an angle greater than the critical angle is totally internally reflected, remains within the body 128 and is transmitted along the length of the light guide 127.

When light is incident on the first surface 62 of a region 60 at an angle less than the critical angle, the light is refracted and passes through the surface 62. Then refracted light is transmitted through the region 60 and exits the region 60 either through the opposing second surface 66 or through an end face 70. If the light exits the region 60 through the second surface 66 the light is then scattered by the light scattering portion 136 at the rear face 138 of the light guide 127, and a proportion of the light is subsequently emitted through the front face 134. If the light exits the region 60 through the end face 70, then the light will eventually strike the rear face 138 further along the length of the light guide 127, with or without passing through a neighboring region 60.

The presence of the first surfaces 62 of the regions 60, therefore, causes a greater proportion of the light to be transmitted along the length of the light guide 127 by total internal reflection between the first surfaces 62 and the front face 134 of the light guide 127.

A proportion of the light that is transmitted along the length of the light guide 127 will pass through the gaps 72 between the regions 60, be scattered by the light scattering portion 136 at the rear face 138 and subsequently be emitted from the front face 134 of the light guide 127. Increasing the spacing or gaps 72 between the regions 60, therefore, increases the proportion of the light that is scattered and emitted from that section of the light guide 127.

The length of the regions 60 and the gaps 72 between them can, therefore, be used to modulate the amount of light transmitted along the length of the light guide 127 and the amount of light incident on the rear face 138 along the length of the light guide 127, thereby affecting the amount of light that is emitted from the light guide 127 at different distances from the first end 132.

If the light guide 127 was formed of only a single light transmissive material, and the body 128 of the light guide 127 and the light scattering portion 136 were both uniform along its length, then with light entering the light guide 127 at the first end 132, the amount of light emitted from the front face 134 would decrease as a function of distance from the first end 132. This is because the amount of light transmitted within the light guide 127 would decrease as a function of distance from the first end 132, and if a fixed proportion of that light is emitted along the length of the light guide 127, due to the uniformity of the light guide, then the overall intensity of the light emitted from the light guide 127 would also decrease as a function of distance from the first end 132.

The inclusion of discrete regions 60 of a second material having a different refractive index can, therefore, be used to control the amount of light that is emitted from the light guide 127 at points along its length. In particular, the proportion of light that is emitted from a part of the light guide 127 can be decreased by increasing the length of the regions 60 and/or decreasing the spacing between the regions 60. Similarly, the proportion of light that is emitted from a part of the light guide 127 can be increased by decreasing the length of the regions 60 and/or increasing the spacing between the regions 60.

In the present example, with light entering a first end 132 of the light guide 127, the length of the regions 60 is constant along the length of the fight guide 127, but the spacing or length of the gaps 72 between the regions 60 increases from the first end 132 to the second end 156.

This arrangement of regions 60 means that proportionally less light is emitted from the light guide 127 closer to the first end 132 and a greater proportion of the light is transmitted along the light guide 127. Proportionally more light is emitted from the light guide 127 at greater distances from the first end 132, and this results in more uniform light emission along the length of the light guide 127.

In this embodiment of the light guide 127, therefore, the length of the regions 60 and the spacing between the regions 60 may be independently tailored to provide the required light extraction along the length of the light guide 127. The advantage of this configuration is that the modification to the light guide 127 is made internally rather than to an external surface of the light guide 127, and furthermore, because the two materials are preferably selected such that there is minimal difference in the refractive indices, the internal regions 60 are not readily visible to a viewer of the light guide 127. Providing and tailoring the discrete regions 60 to provide, for example, more uniform intensity light emission along the length of the light guide 127 can, therefore, be accomplished without changing the visible, external appearance of the light guide 127.

In particular, the textured and metalized rear face 138 may be continuous and uniform so that it has an even appearance, and the internal regions 60 may be unevenly spaced or sized to provide a variable amount of reflection from the metalized rear face 138 resulting in the desired light emission along the length of the light guide 127 with a uniform external appearance.

Accordingly, when the light guide 127 is used in a pointer arm 14 the distribution of emitted light along the length of the pointer arm 14 can be varied without affecting the external styling of the pointer arm 14.

Although in the above embodiment the discrete regions 60 had a rectangular cross-sectional shape, it will be appreciated that the discrete regions may be of any suitable shape. Furthermore, the discrete regions 60 may be located in more than one discontinuous layer within the body 128 of the light guide 127.

In other embodiments of the light guide of the present invention the light scattering portion at or applied to the rear face of the light guide may comprise a fluorescent pigment or fluorescent particles.

As described above the light guides of the present invention allow the light emitted from a face of the light guide to be varied without affecting the external appearance or styling of the light guide. It will be appreciated, therefore, that the light guide may have any appropriate external shape and may not, for example, have the rectangular cross-sectional shape described above. In particular, in the case of a pointer for a display the pointer may taper towards its second end so that the front and rear surfaces are not parallel and are closer together at the second end than the first end.

Additionally, the embodiments described above have related to elongate, straight light guides suitable for use in a pointer of a display. The light guides of the present invention may, however, be used in any suitable application, and are of particular advantage in objects or areas in which the external styling of the light guide cannot be altered, and/or specific design restraints are applied to the object or area, for example halo rings, when used as automotive headlamp running lights or parking lights, and internal illumination in motor vehicles. It will also be appreciated, therefore, that the elongate light guide may not be straight along its length and may be curved so as to form an arc or loop having either a constant radius or a variable bend radius along its length.

The present invention therefore provides an improved strip lighting device incorporating a light guide, including means for controlling the amount of light extracted from the light guide along its length, which overcomes at least some of the problems associated with prior strip lighting devices having art light guides.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A strip lighting device for receiving visible light from a source of illumination for illuminating the device with visible light comprising:
   a main body having opposite front and rear sides extending along the length of the main body, the front side, in use, being disposed towards a viewer of the device, and the rear side including a light scattering layer for scattering light from said source of illumination towards the viewer when the device is illuminated;
   said main body including a front cladding layer and a rear cladding layer extending along the length of said main body, the front cladding layer being relatively forwards of the rear cladding layer relative to said viewer and said layers each being made of a first light transmissive material for conveying said light; and
   a light pipe arranged to receive light from said source of illumination and being made of a second light transmissive material for conveying said light, the light pipe being sandwiched between and in contact with the front and rear cladding layers at, respectively, a front interface and a rear interface, said interfaces extending along the length of the main body, the front interface being smooth to facilitate total internal reflection as light is conveyed along the light pipe and the rear interface including a plurality of angled portions spaced along the length of the light pipe to allow some of said conveyed light to escape from the light pipe into the rear cladding layer to impinge on the light scattering layer whereby the light scattering layer scatters said light though said light transmissive layers of the rear cladding layer, the light pipe and the front cladding layer towards the viewer of the device.

2. A strip lighting device as claimed in claim 1, wherein said interfaces extend along substantially the full length of the main body.

3. A strip lighting device as claimed in claim 1, wherein the main body is straight and the front interface is flat.

4. A strip lighting device as claimed in claim 1, wherein the main body is curved, for example in the shape of an arc or a loop, having along the length of the main body either a constant or a variable bend radius, the bend radius of the main body being sufficiently gentle that at least some of the light from the source of illumination is able to be transmitted along the length of the main body by total internal reflection.

5. A strip lighting device as claimed in claim 1, wherein a difference between the refractive indices of the first light transmissive material and the second light transmissive material is such that the critical angle of incidence for total internal reflection at the front interface is greater than or equal to 70°.

6. A strip lighting device as claimed in claim 1, wherein the first light transmissive material is polymethyl methacrylate and the second light transmissive material is polycarbonate.

7. A strip lighting device as claimed in claim 1, wherein said angled portions comprise triangular notches.

8. A strip lighting device as claimed in claim 1, wherein a depth of the angled portions increases from a first end of the light pipe to a second end of the light pipe, the first end of the pipe being optically closest to the source of illumination.

9. A strip lighting device as claimed in claim 1, wherein a spacing between neighboring angled portions decreases from a first end of the light pipe to a second end of the light pipe, the first end of the pipe being optically closest to the source of illumination.

10. A strip lighting device as claimed in claim 1, wherein the light pipe extends across a full width of the main body.

11. A strip lighting device as claimed in claim 1, wherein the front cladding layer has a greater thickness than the rear cladding layer such that the light pipe is located closer to the rear side of the main body than to the front side of the main body.

* * * * *